(12) United States Patent
Zhou et al.

(10) Patent No.: US 7,993,098 B2
(45) Date of Patent: Aug. 9, 2011

(54) METHOD AND A SYSTEM FOR ADJUSTING ALARM LEVEL OF A COMPONENT IN A WIND TURBINE

(75) Inventors: Yu Zhou, Singapore (SG); Tie Ling Zhang, Singapore (SG)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/861,451

(22) Filed: Aug. 23, 2010

(65) Prior Publication Data

US 2011/0052368 A1 Mar. 3, 2011

Related U.S. Application Data

(60) Provisional application No. 61/237,708, filed on Aug. 28, 2009.

(30) Foreign Application Priority Data

Aug. 25, 2009 (DK) .................................. 2009 70098

(51) Int. Cl.
*F03D 7/04* (2006.01)
(52) U.S. Cl. ............................. 415/118; 416/35; 416/61
(58) Field of Classification Search .................. 415/118; 416/35, 61
See application file for complete search history.

(56) References Cited

U.S. PATENT DOCUMENTS

| 5,132,920 | A | 7/1992 | Bellows et al. |
|---|---|---|---|
| 6,490,543 | B1 | 12/2002 | Jaw |
| 7,677,869 | B2 * | 3/2010 | Martinez De Lizarduy Romo et al. ............................... 416/37 |
| 7,832,980 | B2 * | 11/2010 | Demtroder et al. ........... 415/118 |
| 2008/0255681 | A1 | 10/2008 | Scott et al. |
| 2010/0138267 | A1 * | 6/2010 | Vittal et al. ....................... 705/8 |

OTHER PUBLICATIONS

Daria Petersen; 1st Technical Examination Report issued in Denmark priority patent application No. PA 2009 70098; Jan. 4, 2010; 5 pages; Denmark Patent and Trademark Office.

* cited by examiner

*Primary Examiner* — Nathaniel Wiehe
(74) *Attorney, Agent, or Firm* — Wood, Herron & Evans, L.L.P.

(57) ABSTRACT

A method and a system for adjusting alarm level of a component in a wind turbine is provided. The method comprises defining an alarm level corresponding to an operational parameter of the component in the wind turbine, monitoring the operational parameter of the component, determining whether the operational parameter exceeds the alarm level, thereby triggering an alarm. In the case when the alarm is triggered, the method further comprises inspecting the component to determine whether the alarm level corresponds to a predetermined remaining useful lifetime of the component, and adjusting the alarm level based on the inspection of the component.

15 Claims, 6 Drawing Sheets

METHOD AND A SYSTEM FOR ADJUSTING ALARM LEVEL OF A COMPONENT IN A WIND TURBINE

CROSS-REFERENCE TO RELATED APPLICATIONS

This application claims priority under 35 U.S.C. §119(a) to DK Application No. PA 2009 70098, filed Aug. 25, 2009. This application also claims the benefit of U.S. Provisional Application No. 61/237,708, filed Aug. 28, 2009. Each of the applications is incorporated by reference herein in its entirety.

TECHNICAL FIELD

The present invention relates to a method for adjusting the alarm level of a component in a wind turbine, and to a system for performing the method. More particularly, the present invention relates to a method for adjusting the alarm level of the component in the wind turbine, so that the possibility of a false alarm is reduced.

BACKGROUND

In a condition monitoring system of a wind turbine, a number of parameters relating to the wind turbine are normally measured. Some of these parameters may relate to the health of one or more components of the wind turbine, such as a gear system, part of a gear system, a bearing, a generator, a drive shaft, etc. These parameters may include temperature, load, stress or strain of a component. Measuring and analysing such parameters allow an operator to detect when a component reaches a state where it is likely to break down.

When one of these parameters exceeds a certain value, an alarm is triggered and a service inspection is scheduled to inspect the component. The values, which trigger the alarm if exceeded, are predefined alarm levels of the component. Depending on the alarm level, the inspection is scheduled within a certain time so that the inspected component can be repaired or replaced before it actually fails.

Hence, it is crucial that the alarm levels are defined in such a way that they accurately reflect when the components are expected to fail. If the alarm levels are defined too high, the alarm may only be triggered when the component is about to fail very soon. Hence, the inspection may not be scheduled in time before the component fails, causing the wind turbine to be shut down. Breaking down or failure of the component before the scheduled inspection or maintenance may result in loss of power production, and hence income/profit, during the period between the component break down and the scheduled maintenance. The breaking down of the component before the scheduled maintenance may also require an unscheduled maintenance to be made, resulting in extra cost. If the alarm levels are defined too low, the alarm may be triggered too early which results in unnecessary inspection. This would also result in extra cost. Both of these situations result in increase in maintenance cost, and hence, increase in cost of energy.

In most systems, the alarm levels are predefined based on historical data from other similar components. Once the alarm levels for the components in the wind turbines are defined, they are fixed for the lifetime of the turbine. However, the same type of wind turbine may operate in different areas in the world with different climate. In addition, the characteristics and performance of different wind turbines having the same operating platform may also change due to other factors such as operation time, different components from different suppliers, etc. Thus, the initial alarm levels defined for the components in the wind turbine may not reflect the actual health of the respective components throughout the lifetime of the wind turbine.

Therefore, it is desirable to have a more accurate way of defining and adjusting the alarm levels of the components in a wind turbine.

SUMMARY

Embodiments according to the invention provide a method and a system for adjusting the alarm level of a component in a wind turbine.

According to a first aspect of the invention, a method for adjusting an alarm level of a component in a wind turbine is provided. The method comprises:

defining an alarm level corresponding to an operational parameter of the component in the wind turbine;

monitoring the operational parameter of the component;

determining whether the operational parameter exceeds the alarm level, thereby triggering an alarm;

in the case when the alarm is triggered, inspecting the component to determine whether the alarm level corresponds to a predetermined remaining useful lifetime of the component; and adjusting the alarm level based on the inspection of the component.

In the present context the term 'wind turbine' is interpreted to mean a structure being adapted to extract energy from the wind and convert it into electrical energy. Modern wind turbines normally comprise a tower construction rotatably supporting a nacelle. The nacelle carries a hub having a set of rotor blades attached thereto. The interior part of the nacelle contains energy converting equipment, for example, a drive train including a gear arrangement and a generator, the generator being electrically connected to a power grid.

The term 'remaining useful lifetime' or RUL is interpreted to mean the time which in average will lapse before the component breaks down, if the wind turbine is continuously operated under the current operating conditions. The term 'operational parameter' of a component refers to a physical characteristic of or related to the component which includes, but not limited to, temperature, vibration, stress, strain, etc.

Before the wind turbine is operational, one or more alarm levels for an operational parameter of the component are defined for the component in the wind turbine. During the operation of the wind turbine, the operational parameter of the component is monitored. When the operational parameter exceeds the defined alarm level, an alarm is triggered. Examples of an operational parameter of the component exceeding the defined alarm level include the temperature exceeding a certain threshold, the strain, stress or vibration level of a component is too high, there is a significant change in signal amplitudes, etc.

Each alarm level also corresponds to an expected RUL of the component. This means that depending on which alarm for a given alarm level has been triggered, it can be expected when the component is likely to break down. Therefore, an inspection of the component needs to be scheduled before the component breaks down, that is, within the expected RUL of the component.

The inspection of the component is to determine the health status of the component and determine what appropriate actions should be taken. The term 'health status' means a status being indicative of whether or not and to what extent the component is operational. Thus, the health status for a component may indicate whether the component is likely to break down in the near future, and/or whether a malfunction and/or an error is likely to occur. The health status may also indicate whether the present operating settings are suitable for the component. Data relating to the health status of the component may include, but not limited to, the temperature of the component or in the vicinity of the component, vibrations of the component, stress of the component, strain of the component and/or loads of the component.

When the health status of the component is determined, it may then be decided whether the component needs to be repaired or replaced. The inspection may be done physically by sending a technician to the wind turbine, or it may be done automatically by analysing readings taken from sensors located on or within the vicinity of the component.

During the inspection of the component when the alarm is triggered, it is also determined whether the corresponding alarm level that has been exceeded corresponds to the expected RUL of the component. When the alarm is triggered, it may be determined from the inspection that the actual RUL of the component may be different from the expected RUL for an alarm level. In this case, the alarm level is adjusted accordingly, so that the actual RUL of the component is as close to the expected RUL as possible. The adjusting of the alarm level can be done initially based on historical data. Subsequently, it is possible to adjust the alarm level using artificial intelligence methods such as fuzzy logic or neural networks.

As mentioned earlier, the predefined alarm levels may not accurately reflect the expected RUL of the component. This may give rise to false alarms being triggered, resulting in increased cost or loss of revenue. According to aspects of the invention, the alarm levels are constantly being adjusted during the operation of the wind turbine, so that they accurately reflect the expected RUL of the component. Therefore, the possibilities of false alarms being triggered are reduced.

According to an embodiment, the alarm level is defined based on historical data obtained from components similar or identical to the component. Such historical data may, for example, be obtained in the following manner. When the alarm corresponding to a given alarm level of the component is triggered, the component is monitored and the time between when the alarm was triggered until the component broke down is logged. This is done for a large number of identical or similar components, and thereby statistical information about remaining useful lifetime of the component under various operating conditions is obtained. This information may then be used as a basis for defining alarm levels corresponding to different remaining useful lifetimes of the component under given operating conditions.

According to an embodiment, the historical data comprises data relating to at least one of wind speed, wind direction, wind turbine region, wind turbine age, component age, temperature, failure mode, component remaining useful lifetime, monitoring signal and component manufacturer. Any one of these factors may affect the RUL of the component, and is taken into account when defining the alarm level.

According to an embodiment, the monitoring of the operational parameter of the component includes measuring the operational parameter of the component using one or more sensors. According to this embodiment, the data relating to health status of the component is obtained directly by measurements from the sensor. Examples of suitable sensors include, but not limited to, temperature sensors, vibration sensors, strain sensors and stress sensors. As an alternative to measuring the operational parameters, data relating to health status for the component may be obtained in an indirect manner.

According to an embodiment, the method further includes generating an inspection report based on the inspection of the component, wherein the alarm level is adjusted based on the inspection report. The inspection report may include information such as procedures taken during the inspection process, findings and/or outcome of the inspection, and any recommendation actions to be taken. Such information in the inspection report can be stored in a central database and may be useful for current and future reference. The alarm level is then adjusted based on the inspection report. The adjusting of the alarm level may be done manually by a technician or in an automated manner.

According to an embodiment, the adjusting of the alarm level includes:
  increasing the alarm level when it is determined from the inspection that the actual RUL of the component is longer than the expected RUL; and
  decreasing the alarm level when it is determined from the inspection that the actual RUL of the component is shorter than the expected RUL.

When the actual RUL of the component is longer than its expected RUL corresponding to a given alarm level, it means that the alarm for the alarm level is triggered too early. Accordingly, the alarm level is increased so that the alarm for the given alarm level can be triggered later. Similarly, when the actual RUL of the component is shorter than its expected RUL, it means that the alarm for the alarm level is triggered too late. Accordingly, the alarm level is decreased so that the alarm for the given alarm level can be triggered earlier. Therefore, the alarm level is adjusted such that the actual RUL of the component is closer to its expected RUL for the given alarm level.

According to an embodiment, the adjusting of the alarm level includes obtaining turbine monitoring data, and adjusting the alarm level based on the obtained turbine monitoring data. Turbine monitoring data may include wind speed, wind direction, region in which the wind turbine is located, age of the wind turbine, age of the component, temperature, failure mode of the component, component remaining useful lifetime or monitoring signal. This information can be obtained and logged in a central repository in the wind turbine or in a separate server located in a remote location from the wind turbine. At least part of this information is taken into account when adjusting the alarm level of the component.

According to a second aspect, the invention provides a system for adjusting alarm level of a component in a wind turbine, the system comprising:
  A first processing unit adapted to define an alarm level corresponding to an operational parameter of the component in the wind turbine;
  A sensing unit adapted to monitor the operational parameter of the component;
  A second processing unit adapted to determine whether the operational parameter exceeds the alarm level, thereby triggering an alarm;
  A third processing unit adapted to determine whether the alarm level corresponds to a predetermined remaining useful lifetime of the component in the case when the alarm is triggered; and
  A fourth processing unit adapted to adjust the alarm level based on an output from the third processing unit.

It should be noted that a person skilled in the art would readily recognise that any feature described in combination with the first aspect of the invention could also be combined with the second aspect of the invention, and vice versa. The system according to the second aspect of the invention may advantageously be adapted to perform the method of the first aspect of the invention.

According to this embodiment, the system allows the alarm level of the component in the wind turbine to be constantly adjusted, so that alarms corresponding to the predefined remaining useful lifetime of the component can be triggered to facilitate inspection of the component at appropriate times. This reduces the number of false alarms been triggered, and hence, reduces the cost of maintenance.

According to an embodiment, the system further comprises a report generator adapted to generate an inspection report based on an inspection of the component when the alarm is triggered. The alarm level is adjusted based on the inspection report.

According to an embodiment, at least one of the first, second, third and fourth processing units are part of a main controller of the wind turbine.

The invention further relates to a wind power plant comprising at least one wind turbine. The wind turbine comprises:
- A first processing unit adapted to define an alarm level corresponding to an operational parameter of a component in the wind turbine;
- A sensing unit adapted to monitor the operational parameter of the component;
- A second processing unit adapted to determine whether the operational parameter exceeds the alarm level, thereby triggering an alarm;
- A third processing unit adapted to determine whether the alarm level corresponds to a predetermined remaining useful lifetime of the component in the case when the alarm is triggered; and
- A fourth processing unit adapted to adjust the alarm level based on an output from the third processing unit.

BRIEF DESCRIPTION OF THE DRAWINGS

The invention will now be described in further detail with reference to the accompanying drawings in which.

DETAILED DESCRIPTION

Figure 1:
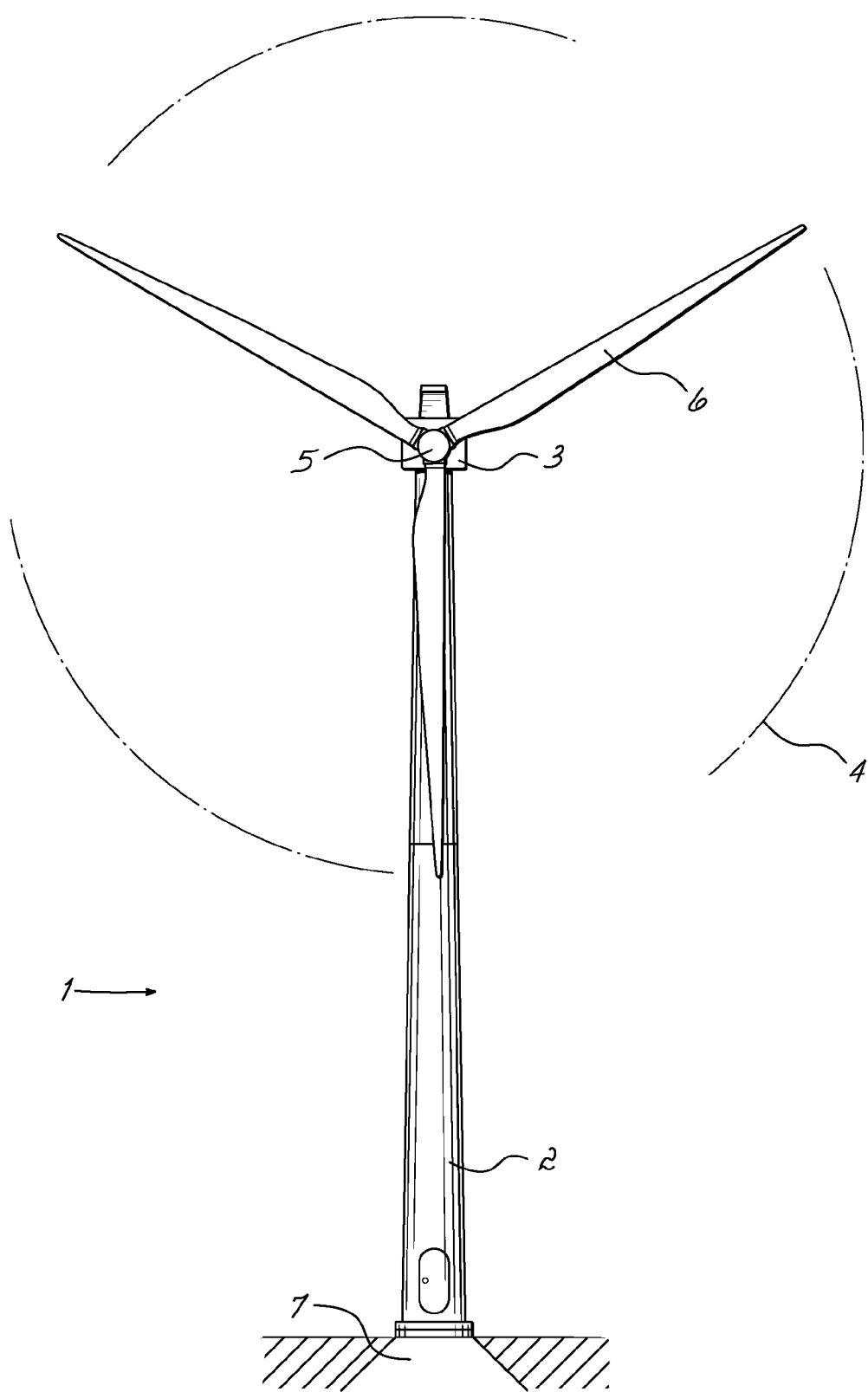
FIG. 1 illustrates a structure of a wind turbine.

FIG. 1 shows a general setup of a wind turbine 1. The wind turbine 1 includes a tower 2 having a number of tower sections, a nacelle 3 positioned on top of the tower 2, and a rotor 4 extending from the nacelle 3. The tower 2 is erected on a foundation 7 built in the ground. The rotor 4 is rotatable with respect to the nacelle 3, and includes a hub 5 and one or more blades 6. Wind incident on the blades 6 causes the rotor 4 to rotate with respect to the nacelle 3. The mechanical energy from the rotation of the rotor 4 is converted into electrical energy by a generator (not shown) in the nacelle 3. The generated electrical energy can be supplied to an electrical grid or to a local community.

Wind turbines are expected to be in operation for many years. Therefore, various monitoring systems are used to monitor the operating health of components in the wind turbines. Examples of such components include, but not limited to, gearbox, generator, yaw bearings, etc. This is done by having many sensors in the wind turbines to obtain data relating to physical characteristics of the components in the wind turbines, and processing these data to determine whether any of the components has a high possibility of breaking down. When a component is determined to have a high possibility of breaking down, the component is replaced or some other corrective measures are taken.

Figure 2C:
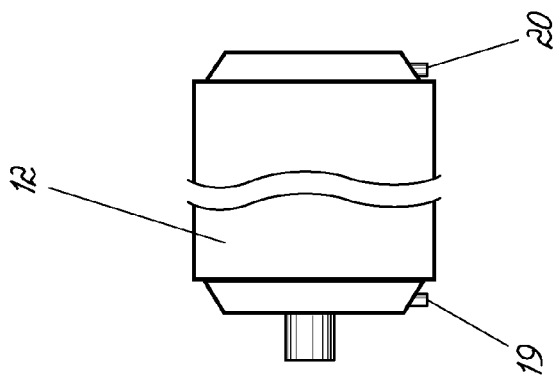
FIGS. 2a-2c illustrate sensors arranged on a gear box and a generator in the wind turbine.
Figure 2B:
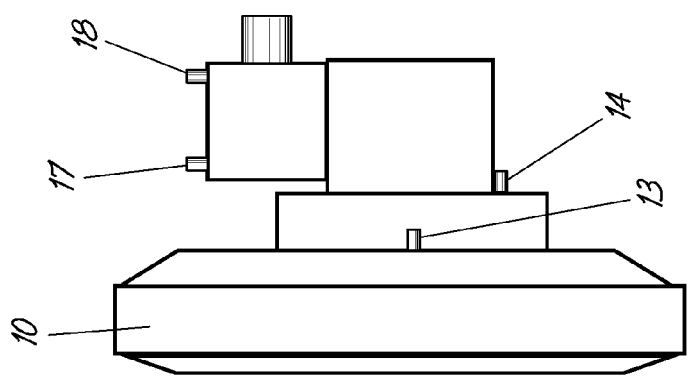
Figure 2A:
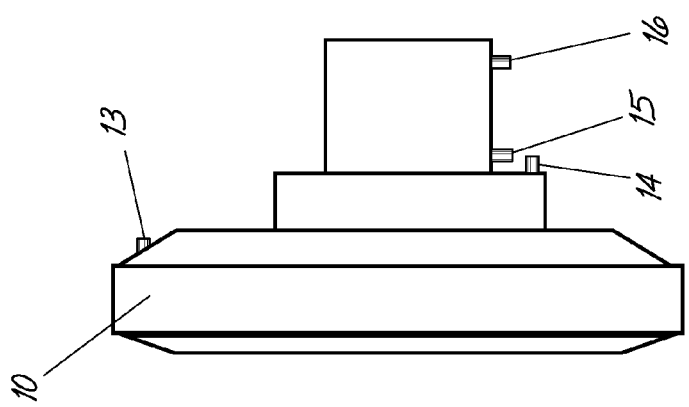

FIG. 2a shows a side view of a gear box 10 of a wind turbine. FIG. 2b shows a top view of the gear box 10 of FIG. 2a. FIG. 2c shows a side view of a generator 12 of the wind turbine. The gear box 10 and the generator 12 are provided with a total of eight accelerometers 13-20, arranged at various positions of the gear box 10 and the generator 12. The accelerometers 13-20 are used for detecting vibrations in the gear box 10 or in the generator 12, respectively, at their respective positions. The result of the measurements performed by the sensors 13-20 is analysed in a condition monitoring system (CMS), and based on the analysis a health state for the gear box 10 and a health state for the generator 12 are derived. Thus, if one or more of the sensors 13-18 arranged on the gear box 10 present an elevated vibration level, this is an indication that the gear box 10 is in a non-optimal health state. The CMS then triggers a corresponding alarm for the gear box 10. Similarly, if one or both of the sensors 19, 20 arranged on the generator 12 measure an elevated vibration level, it is concluded that the generator 12 is in non-optimal health state, and a corresponding alarm is triggered for the generator 12.

It should be noted that the gear box 10 and/or the generator 12 may alternatively or additionally be provided with other kinds of sensors, such as temperature sensors, which can be used for measuring a parameter being indicative of the health status of the component. Furthermore, the gear box 10 and/or the generator 12 may be provided with any number of sensors in alternative embodiments.

Different alarm levels may be set for different vibration levels at the gearbox 10 and/or generator 12. For example, 4 alarm levels may be set for the gearbox with alarm level 1 being the least severe and alarm 4 the most severe. If alarm level 1 is triggered, it means that the gearbox 10 starts to demonstrate some signs of failing, and may break down in the near future. If alarm level 4 is triggered, it means that the gearbox 10 is going to break down very soon and maintenance should be scheduled immediately to repair or replace the component.

Figure 3:
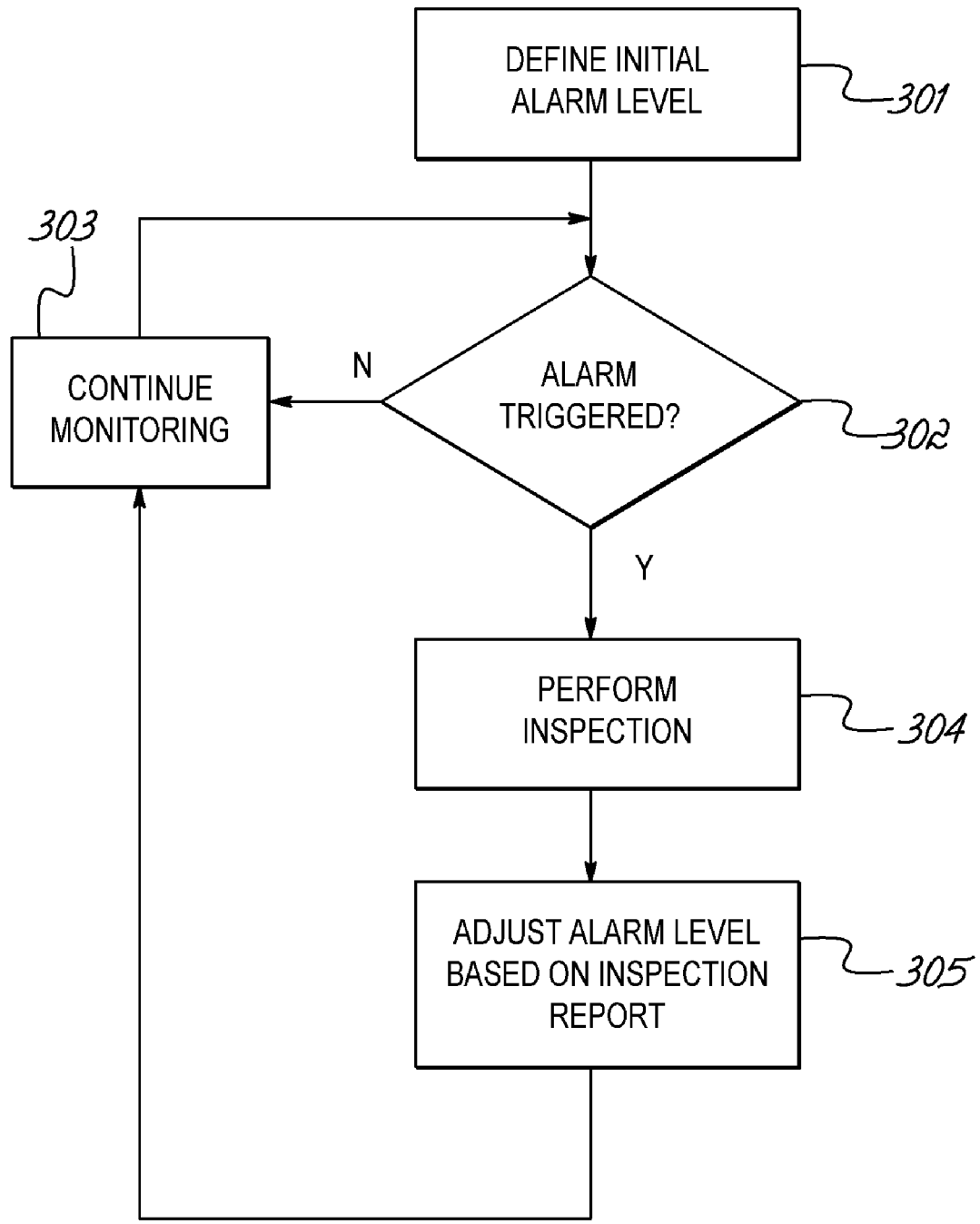
FIG. 3 is a flow chart illustrating a method for adjusting alarm level of a component in the wind turbine according to an embodiment.

FIG. 3 shows a flow chart of a method for adjusting alarm levels of a component in the wind turbine according to an embodiment. In one example, the component is a gearbox, and the method according to the embodiment adjusts the alarm levels of the gearbox. Step 301 includes defining an initial alarm level for an operational parameter, for example vibration level, of the component. The alarm level corresponds to an expected remaining useful lifetime (RUL) of the component. In other words, when an alarm level of the component is exceeded, the component is likely to fail after a predefined elapsed time period (known as the RUL). More than one alarm level may be defined for the component, with each alarm level corresponding to a different expected RUL of the component.

As mentioned in the example earlier, 4 alarm levels may be set for different vibration levels of the gearbox. Alarm level 1 is the least severe and alarm level 4 is the most severe. This means that the vibration level corresponding to alarm level 1 is lower than the vibration level corresponding to alarm levels 2, 3 and 4. The vibration level corresponding to the different alarm levels may be defined based on historical data from similar or identical components from other turbines. Specifically, the failure information of gearboxes from other wind turbines is used to predict the RUL of the current gearbox being monitored. Once all the alarm levels of the component have been defined, the wind turbine is put into operation.

The operational characteristic of the component in the wind turbine is monitored in step 302 to determine if any of the predefined alarm levels are exceeded. If none of the alarm levels of the component are exceeded, the method continues to monitor in step 303 if any of the alarm levels of the component are exceeded. In the example when the component is the gearbox, the vibration level of the gearbox is continuously being monitored to determine whether the vibration level exceeds any of the defined alarm levels.

Once the operational characteristic of the component, or the vibration level in the case of the gearbox, exceeds any of the predefined alarm level, an alarm is triggered. When the alarm is triggered, an inspection of the component is scheduled in step 304. The inspection has to take place within the RUL of the component to prevent any down time of the wind turbine. In one embodiment, when the alarm is triggered, the method determines which alarm level of the component has been exceeded before scheduling the inspection. Depending on the alarm level that has been exceeded, the inspection is accordingly scheduled at an appropriate time.

Figure 4A:
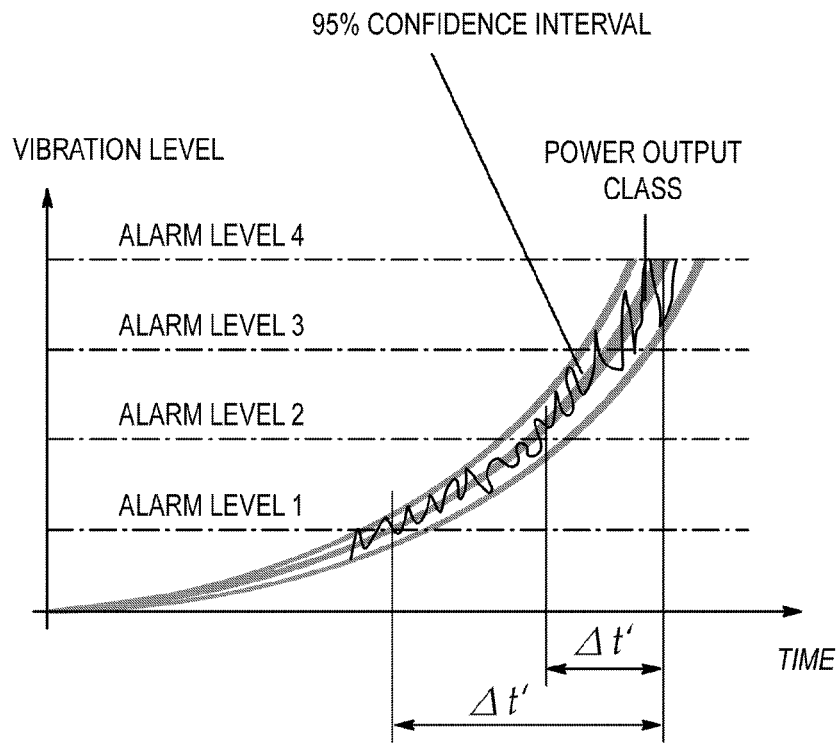
FIG. 4a illustrates the different alarm levels of the component and their corresponding remaining useful lifetime.

An example of how alarm levels correspond to RUL can be illustrated with reference to FIG. 4a. FIG. 4a shows a graph illustrating the RUL of a component for a given power output class after a given alarm level is detected. The term 'power output class' refers to an output power interval for the wind turbine. In the graph the vibration level of the component is plotted against time. Four vibration levels corresponding to four alarm levels, alarm level 1-4, are marked. Thus, when the vibration level of the component reaches the level marked 'alarm level 2', an alarm corresponding to alarm level 2 is triggered for the component. Alarm level 4 is the most severe level, and when this level is reached, the component is very likely to break down, and operation of the wind turbine has to be stopped.

The average vibration level as well as the 95% confidence interval band is plotted. When the vibration level corresponding to alarm level 1 is reached, the RUL is the time elapsing from the time alarm level 1 is detected until the time alarm level 4 is reached, and the component is most likely to break down. This time interval is marked as $\Delta t$. When the vibration level corresponding to alarm level 2 is reached, the RUL is the time elapsing from the time alarm level 2 is detected until the time alarm level 4 is reached. This RUL is marked as $\Delta t'$. It should be noted that the time $\Delta t'$ corresponding to the RUL when alarm level 2 is detected is shorter than the time $\Delta t$ corresponding to the RUL when alarm level 1 is detected.

Accordingly, when the alarm corresponding to alarm level 1 is triggered, the inspection should be scheduled within the time $\Delta t$. Similarly, when the alarm corresponding to alarm level 2 is triggered, the inspection should be scheduled within the shorter time $\Delta t'$.

The curve shown in FIG. 4a may be obtained from measurements obtained from a large number of identical or similar components. Curves representing the vibration level versus the running time after a given alarm level is triggered may be plotted. The curve in FIG. 4a is then obtained based on these curves.

Figure 4B:
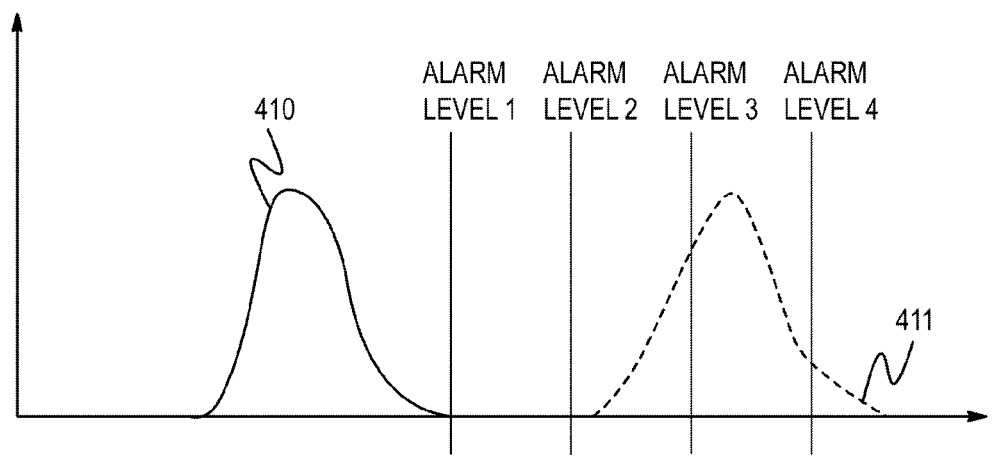
FIG. 4b illustrates a graph used for defining alarm levels of the component.

Another example of how alarm levels correspond to RUL can be illustrated with reference to FIG. 4b. FIG. 4b shows a graph comprising two curves 410, 411. The first curve 410 represents data relating to a component obtained from a group of wind turbines. This group of wind turbines may be the same model of turbines in different wind parks, or similar types of wind turbines in the same wind farm. The component data obtained from the group of wind turbines may be averaged and represented by the curve 410. For example, if the component to be monitored is gearbox, the vibration level of gearboxes from the group of wind turbines may be obtained. The curve 410 thus forms the reference data for the component, or reference vibration level for the case of the gearbox.

The second curve 411 represents data relating to the component in the wind turbine to be monitored. The component data obtained from the monitored wind turbine is plotted to form the curve 411. For example, the vibration level of the gearbox of the wind turbine is monitored, and plotted to form the curve 411. When the gearbox of the wind turbine is healthy, its vibration level should be similar to the reference vibration level, that is, to the average vibration level of the other gearboxes in the other turbines. Hence, there should be minimal deviation of the vibration level of the monitored gearbox from the reference vibration level. In FIG. 4b, the second curve 411 should almost coincide with the first curve 410. When a fault in the gearbox starts to develop, the vibration level may increase. This results in deviation of vibration level of the monitored gearbox from the reference vibration level. Accordingly, the second curve 411 shifts away from the first curve 410.

A few alarm levels may be set to correspond to the amount of deviation of the vibration level from the reference vibration level. In FIG. 4b, four alarm levels are defined. Each alarm level corresponds to a RUL of the component. When alarm level 1 is triggered, the RUL is $\Delta t1$, and the inspection of the component should be scheduled within $\Delta t1$. When alarm level 2 is triggered, the RUL is $\Delta t1'$, which is shorter than $\Delta t1$. Hence, the inspection of the component should be scheduled within the shorter time of $\Delta t1'$ before the component is expected to break down.

During the inspection in step 304 of FIG. 3, it is determined whether the actual RUL of the component corresponds to its expected RUL of the corresponding alarm level. The inspection may be done by a user manually, or it can be done automatically using sensors or other monitoring systems in the turbine. Based on the inspection, whether manually or automatically, an inspection report may be generated in an embodiment.

The inspection report may include information including but not limited to turbine type, ID, park/site name, inspection date, reason for inspection, performed task, results of the inspection, conclusion, action plan, etc. In the inspection report, the failure status of the components and corresponding action plan to be taken may also be included.

When it is determined that the actual RUL of the component does not correspond to its expected RUL of the detected alarm level, the corresponding alarm level is adjusted in step 305. The alarm level may be adjusted manually by a user based on readings from the inspection report. It is also possible that a controller adjusts the alarm level, for example, using methods based on artificial intelligence.

In one embodiment, when it is determined from the inspection that the actual RUL of the component is longer than the expected RUL corresponding to the detected alarm level, the alarm level is increased. For example, when a certain alarm level is detected, the expected RUL of the component should be 3 months. However, it is determined that the actual RUL of the component is 4 months. This means that the alarm corresponding to the alarm level is triggered too early. According to the embodiment, the alarm level is made higher, so that the corresponding alarm is only triggered later, that is, when the RUL of the component is about 3 months. Therefore, the alarm level is adjusted so that it now corresponds to the expected RUL of the component more closely. This allows scheduled maintenance to be made more accurately, without having unnecessary extra inspections or turbine down time.

Similarly, when it is determined from the inspection that the actual RUL of the component is shorter than the expected RUL corresponding to the detected alarm level, the alarm level is decreased or lowered. This means that the alarm corresponding to the alarm level is triggered too late. Hence, the alarm level is made lower, so that the corresponding alarm is triggered earlier in the future. This allows sufficient time for an inspection to be scheduled before the component breaks down, resulting in turbine down time.

After the alarm level has been adjusted, the method continues to monitor operation of the turbine in step 303 to determine whether any alarm level is exceeded, and the process is repeated.

Figure 5:
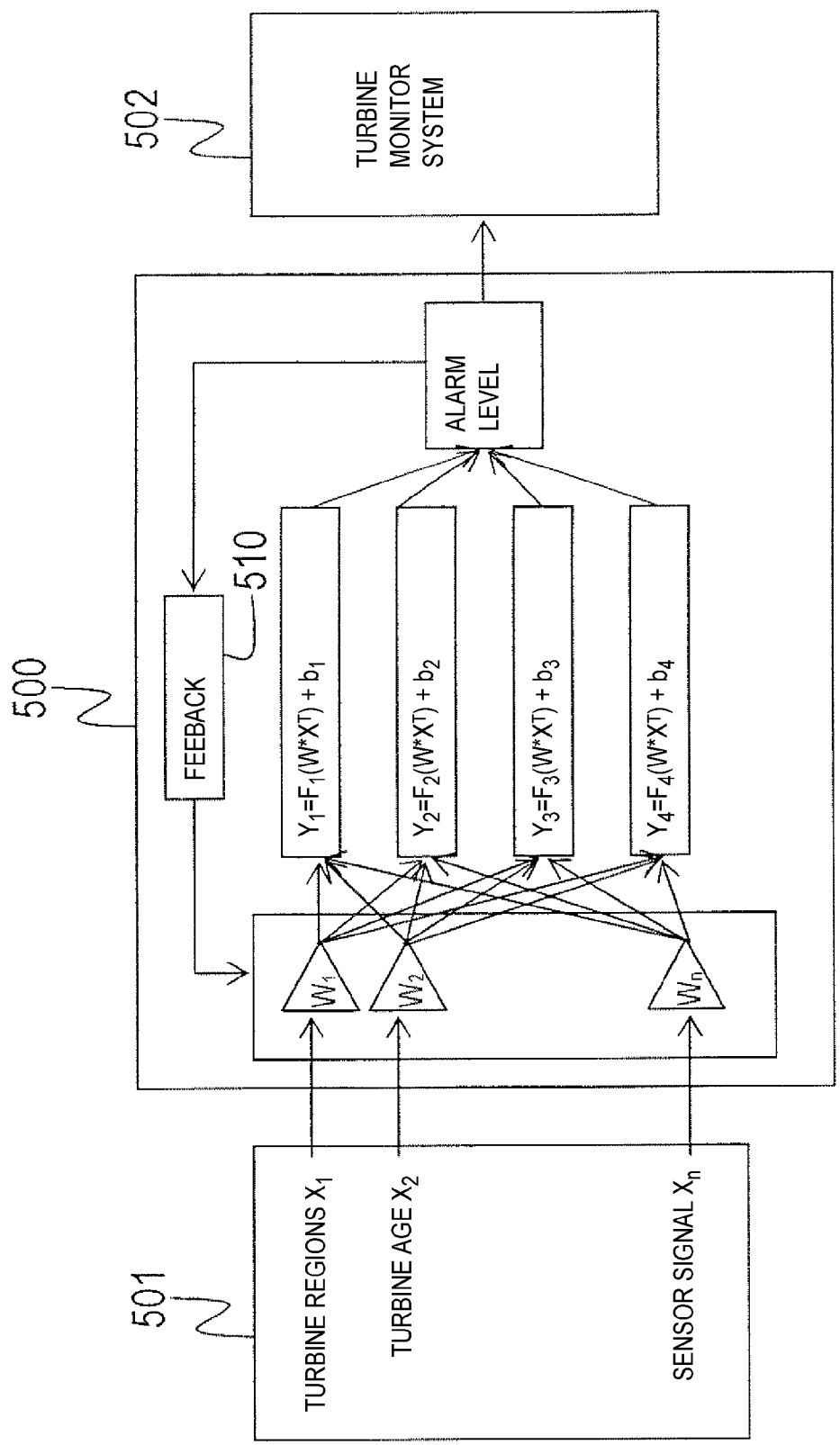
FIG. 5 illustrates a block diagram of an adaptive alarm system according to an embodiment.

FIG. 5 shows a block diagram of an implementation of an adaptive alarm system 500 according to an embodiment. The alarm system 500 receives inputs from a turbine monitor database 501 and sets the alarm levels for the various components in the wind turbine. A turbine monitor system 502 then monitors the operational parameters of the components to determine whether any of the alarm levels are exceeded.

The alarm levels for the components are calculated based on different factors which may have an impact on the RUL of the components. These factors include but not limited to turbine field regions or countries, turbine age, component suppliers, models, failure modes, monitoring signals, etc. These factors are obtained from the turbine monitor database 501 as inputs to the alarm system 500. Weightings of these factors can be represented as $W_1, W_2, \ldots, W_n$. The initial weightings of these factors may be determined based on historical data, and the alarm levels for the components are determined accordingly, and may be represented as $Y_1, Y_2, Y_3$ and $Y_4$. It should be noted that more or less than 4 alarm levels may be defined. If there are more than 4 alarm levels, for example 5 alarm levels are defined, the alarm levels may be represented at $Y_1, Y_2, Y_3, Y_4$ and $Y_5$. The turbine monitor system 502 monitors the components of the turbine to determine whether any of the alarm levels $Y_1, Y_2, Y_3$ and $Y_4$ are exceeded.

When an alarm level is exceeded, an inspection is scheduled. From the inspection, a feedback or error signal (represented by block 510) is provided on the accuracy of the alarm level, i.e., whether the alarm was triggered too early or too late. Based on the feedback or error signal, the alarm level is adjusted accordingly. The alarm level may be adjusted by adjusting the corresponding weightings $W_1, W_2, \ldots, W_n$. For example, if the detected failure mode is not as severe as expected during the inspection, the weighting corresponding to that failure mode may be adjusted so that the corresponding alarm level is increased. Additionally or alternatively, the weightings $W_1, W_2, \ldots, W_n$ may also be adjusted even when no alarms are triggered (i.e., without any feedback or error signals). For example, when the turbine age is increased, the weighting corresponding to the turbine age may need to be adjusted. In another example, when component operating life is increased, the corresponding weighting may also be adjusted so that the alarm levels are decreased. If the component is replaced, the weighting corresponding to component operating life is adjusted again so that the alarm levels are increased accordingly. It should be noted that when any of the weightings are adjusted, new alarm levels $Y_1, Y_2, Y_3$ and $Y_4$ are generated. The new alarm levels are then used by the turbine monitor system 502 for determining if any of the alarm levels of the components are exceeded.

It should be noted that the adjusting of the weightings, and hence, the alarm levels may be done adaptively using neural networks or other artificial intelligence such as neural-fuzzy, ADALINE, etc. According to the embodiment, the alarm levels for the components in the wind turbines are adjusted adaptively, so that it always reflects the actual condition of the components.

The alarm levels $Y_1, Y_2, Y_3$ and $Y_4$ in FIG. 5 can be calculated using the following expression:

$$Y_i = F_i(W*X^T) + b_i$$

where $X = [X_1, X_2, \ldots, X_n]$ and is a vector comprising factors which affect the component, $W = [W_1, W_2, \ldots, W_n]$ and is a vector comprising weightings for the factors, $X^T$ is the transpose vector X, $b_i$ are the initial alarm levels for the component, and $F_i()$ denotes different functions for the different alarm levels. i is any numbers from 1 to m, where m denotes the number of alarm levels defined by a user. In the current example with 4 alarm levels, m is defined as 4 and hence i=1, 2, 3, 4. It should be noted that the expression used in FIG. 5 is only an example, and different expressions or equations may be used to determine the alarm levels for the component.

Figure 6:
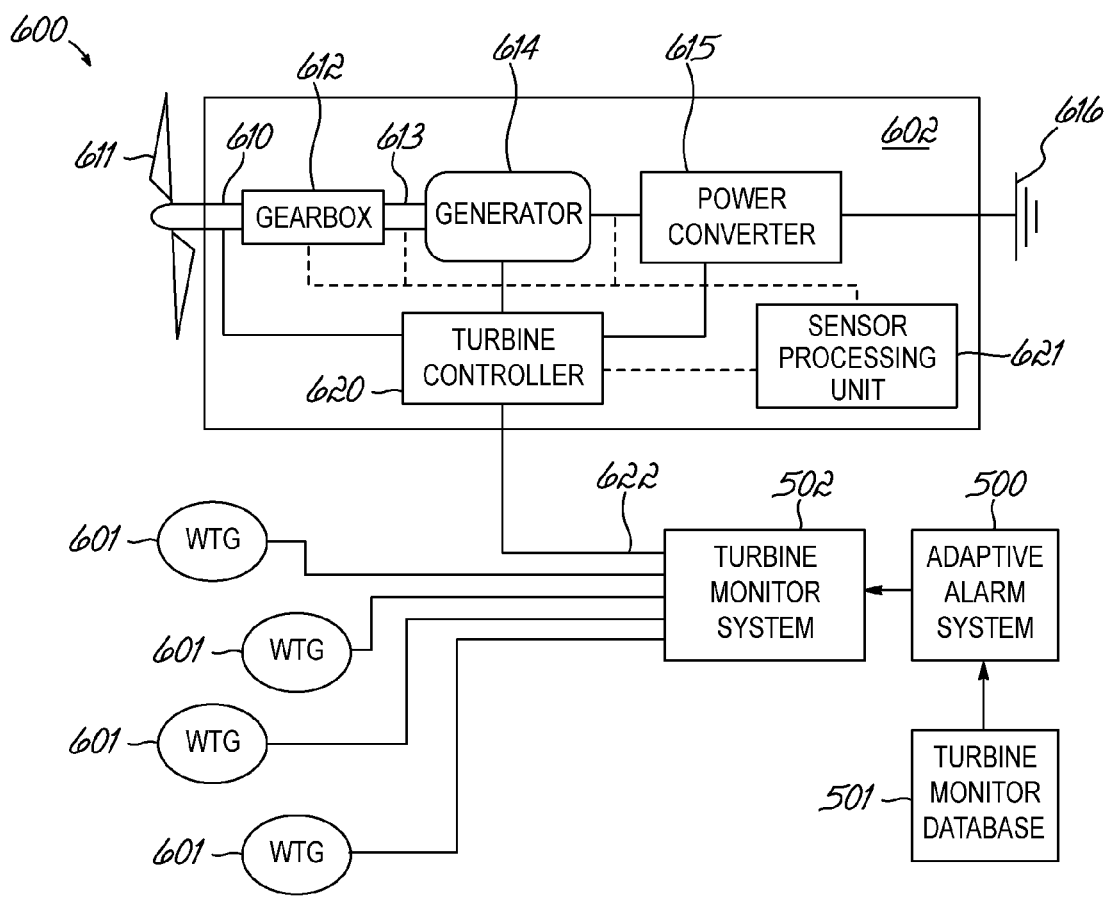
FIG. 6 illustrates a wind farm incorporating the adaptive alarm system according to an embodiment

FIG. 6 shows a layout of a wind farm 600 having the adaptive alarm system 500 according to an embodiment. The wind farm 600 includes one or more wind turbines 601. The electrical layout of a wind turbine 601 is illustrated in block 602. The wind turbine 601 includes a main shaft 610 having one end coupled to one or more blades 611 and the other end coupled to a gearbox 612. The gearbox 612 translates a low rotational speed of the main shaft 610 to a generator rotor 613 having high rotational speed. The generator rotor 613 is coupled to a generator 614 for generating electrical power. The power generated by the generator 614 is converted by a power converter 615 into suitable power for a grid 616. The wind turbine 601 also includes a turbine controller 620 for directly or indirectly controlling the operation of the converter 615, the generator 614 and the pitching of the blades 611. It should be noted that only a very general layout of the wind turbine 601 is illustrated in FIG. 6, in order to illustrate the embodiments of the invention. The embodiments shall not be limited to the turbines or wind farms having the exact layout illustrated in FIG. 6.

Sensors for monitoring operational parameters of the components of the wind turbine are suitably placed on or near the components to be monitored. Signals 622 from these sensors may be pre-processed in a sensor processing unit 621 and then sent to the turbine controller 620. Alternatively, the sensor signals 622 may be sent directly to the turbine controller 620.

The adaptive alarm system 500, the turbine monitor system 502 and the turbine monitor database 501 as described in FIG. 5 may be located within the wind farm 600, or at a location remote from the wind farm 600, and may be connected to the wind farm 600 via a supervising and monitoring unit (not shown). The turbine monitor system 502 receives the sensor signals 622 from the wind turbines 601 in the wind farm 600 and determines whether the operational parameter of any components represented by the sensor signals exceeds their corresponding alarm levels predefined by the adaptive alarm system 500. If an alarm level is exceeded, a corresponding alarm is triggered and an inspection is scheduled. Based on the inspection, the alarm level is adjusted by the adaptive alarm system 500. The turbine monitor system 502 continues to monitor the sensor signals 622 to determine whether any of the adjusted alarm levels are exceeded. The method performed by the adaptive alarm system 500 for monitoring and adaptively adjusting the alarm level to reduce false alarms has already been described with reference to FIG. 3.

It should be emphasized that the above-described embodiments are possible examples of implementations which are merely set forth for a clear understanding of the principles of the invention. The person skilled in the art may make many variations and modifications to the above-described embodiment(s) of the invention, said variations and modifications are intended to be included herein within the scope of the following claims.

What is claimed is:

1. A method for adjusting alarm level of a component in a wind turbine, comprising:
 defining an alarm level corresponding to an operational parameter of the component in the wind turbine;
 monitoring the operational parameter of the component;
 determining whether the operational parameter exceeds the alarm level, thereby triggering an alarm;
 in the case when the alarm is triggered, inspecting the component to determine whether the alarm level corresponds to a predetermined remaining useful lifetime of the component; and
 adjusting the alarm level based on the inspection of the component.

2. The method of claim 1, wherein the alarm level is defined based on historical data obtained from components similar or identical to the component.

3. The method according to claim 2, wherein the historical data comprises data relating to at least one of wind speed, wind direction, wind turbine region, wind turbine age, component age, temperature, failure mode, component remaining useful lifetime, monitoring signal and component manufacturer.

4. The method according to claim 1, wherein monitoring the operational parameter of the component comprises measuring the operational parameter of the component by means of one or more sensors.

5. The method according to claim 1, wherein monitoring the operational parameter of the component comprises monitoring vibration level or temperature of the component.

6. The method according to claim 1, further comprising generating an inspection report based on the inspection of the component, wherein the alarm level is adjusted based on the inspection report.

7. The method according to claim 1, wherein adjusting the alarm level comprises:
 increasing the alarm level when it is determined from the inspection that the alarm level correspond to a remaining useful lifetime of the component which is longer than the predetermined remaining useful lifetime; and
 decreasing the alarm level when it is determined that the alarm level correspond to a remaining useful lifetime of the component which is shorter than the predetermined remaining useful lifetime.

8. The method according to claim 1, wherein adjusting the alarm level comprises:
 obtaining turbine monitoring data; and
 adjusting the alarm level based on the obtained turbine monitoring data.

9. The method according to claim 8, wherein the turbine monitoring data comprises at least one of wind speed, wind direction, wind turbine region, wind turbine age, component age, temperature, failure mode, component remaining useful lifetime and monitoring signal.

10. A system for adjusting alarm level of a component in a wind turbine, comprising:
 one or more sensors operatively coupled to the component and configured to monitor the operational parameter of the component;
 a turbine monitor system operatively coupled to the one or more sensors; and
 an adaptive alarm system operatively coupled to the turbine monitor system and configured to define an alarm level corresponding to an operational parameter of the component in the wind turbine, the turbine monitor system configured to determine whether the operational parameter exceeds the alarm level, thereby triggering an alarm, the adaptive alarm system further configured to determine whether the alarm level corresponds to a predetermined remaining useful lifetime of the component in the case when the alarm is triggered, and
 to adjust the alarm level based on the determination whether the alarm level corresponds to the predetermined remaining useful lifetime of the component.

11. The system of claim 10, wherein the adaptive alarm system is adapted to define the alarm level based on historical data obtained from components similar or identical to the component.

12. The system according to claim 10, wherein the one or more sensors is adapted to monitor vibration level or temperature of the component.

13. The system according to claim 10, wherein the adaptive alarm system is configured to adjust the alarm level by:
 increasing the alarm level when it is determined that the alarm level corresponds to a remaining useful lifetime of the component which is longer than the predetermined remaining useful lifetime; and
 decreasing the alarm level when it is determined that the alarm level corresponds to a remaining useful lifetime of the component which is shorter than the predetermined remaining useful lifetime.

14. The system according to claim 10, wherein the adaptive alarm system is configured to adjust the alarm level by:
 obtaining turbine monitoring data; and
 adjusting the alarm level based on the obtained turbine monitoring data.

15. A wind power plant comprising:
 at least one wind turbine, wherein each wind turbine comprises:
  one or more sensors operatively coupled to the component and configured to monitor the operational parameter of the component;
  a turbine monitor system operatively coupled to the one or more sensors; and
  an adaptive alarm system operatively coupled to the turbine monitor system and configured to define an alarm level corresponding to an operational parameter of the component in the wind turbine, the turbine monitor system configured to determine whether the operational parameter exceeds the alarm level, thereby triggering an alarm, the adaptive alarm system further configured to determine whether the alarm level corresponds to a predetermined remaining useful lifetime of the component in the case when the alarm is triggered, and
  to adjust the alarm level based on the determination whether the alarm level corresponds to the predetermined remaining useful lifetime of the component.

* * * * *